United States Patent
Nishigaki et al.

(10) Patent No.: US 10,808,638 B2
(45) Date of Patent: Oct. 20, 2020

(54) CONTROL DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Takahiro Nishigaki, Nagoya (JP); Ryohei Sugamata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/809,783

(22) Filed: Mar. 5, 2020

(65) Prior Publication Data

US 2020/0300192 A1    Sep. 24, 2020

(30) Foreign Application Priority Data

Mar. 18, 2019   (JP) .................. 2019-049576

(51) Int. Cl.
   *F02D 41/18*    (2006.01)
   *F02D 41/00*    (2006.01)

(52) U.S. Cl.
   CPC ....... *F02D 41/182* (2013.01); *F02D 41/0002* (2013.01)

(58) Field of Classification Search
   CPC ............ F01N 2900/1602; F01N 3/101; F01N 3/2066; F01N 3/0814; F01N 2550/02; F01N 3/2006; F01N 3/035; F01M 13/04; F01M 13/00; F01M 2013/0438; F01M 2013/0038; F02M 35/10222; F02D 2250/08; F02D 41/182; F02D 41/0002
   See application file for complete search history.

(56) References Cited

U.S. PATENT DOCUMENTS

| | | | | |
|---|---|---|---|---|
| 7,155,901 B2 * | 1/2007 | Michelini | ............. | F01N 3/2006 123/90.15 |
| 8,806,856 B2 * | 8/2014 | Nakagawa | .......... | F02D 41/0235 60/285 |
| 8,918,267 B2 * | 12/2014 | Nakagawa | .............. | F02D 13/08 701/103 |
| 9,458,781 B2 * | 10/2016 | Tanaka | ................ | F02D 41/0235 |
| 2002/0144500 A1 | 10/2002 | Nakata | | |
| 2013/0255606 A1 | 10/2013 | Nishikiori et al. | | |
| 2015/0175147 A1 | 6/2015 | Teraya et al. | | |

FOREIGN PATENT DOCUMENTS

| | | |
|---|---|---|
| JP | 2002-371836 A | 12/2002 |
| JP | 2009-202662 A | 9/2009 |
| JP | 5962640 B2 | 8/2016 |
| WO | 2012/056535 A1 | 5/2012 |

* cited by examiner

*Primary Examiner* — Sizo B Vilakazi
(74) *Attorney, Agent, or Firm* — Oliff PLC (57) ABSTRACT

An air amount control valve of a vehicle changes an intake air amount drawn into a cylinder. A fuel cutoff process stops fuel injection from a fuel injection valve when stopping combustion in the cylinder in a case in which a crankshaft is rotating. When execution of the fuel cutoff process is requested, a temperature-increase limiting process is executed to draw fresh air into a catalyst by increasing the intake air amount through control of the air amount control valve. In a case in which an anomaly occurs in driving of the air amount control valve when executing the temperature-increase limiting process, an amount of air drawn into the catalyst is increased by increasing an engine speed.

7 Claims, 5 Drawing Sheets

(a) Vehicle Speed VS (b) Fuel Cutoff Process (c) Throttle Open Degree TA (d) Motoring (e) Intake Air Amount GA

(f) Catalyst Temperature TC

CONTROL DEVICE AND CONTROL METHOD FOR VEHICLE

BACKGROUND

1. Field

The following description relates to a control device and a control method for a vehicle including an internal combustion engine.

2. Description of Related Art

Japanese Laid-Open Patent Publication No. 2002-371836 discloses an internal combustion engine configured to draw fresh air into a catalyst arranged in an exhaust passage to reduce the temperature of the catalyst when stopping fuel injection as the vehicle decelerates. In this document, the open degree of a throttle valve is increased to draw in fresh air.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A control device for a vehicle is provided. The vehicle is equipped with an internal combustion engine. The internal combustion engine includes a catalyst arranged in an exhaust passage, a fuel injection valve that injects fuel into a cylinder, an air amount control valve that changes an intake air amount drawn into the cylinder, and a blow-by gas passage through which blow-by gas leaked from the cylinder into a crankcase is drawn into an intake passage. The control device includes an engine control unit configured to execute a fuel cutoff process, the fuel cutoff process stopping fuel injection from the fuel injection valve when stopping combustion in the cylinder in a case in which a crankshaft of the internal combustion engine is rotating and an air-increasing unit configured to execute a temperature-increase limiting process when execution of the fuel cutoff process is requested, the temperature-increase limiting process drawing fresh air into the catalyst by increasing the intake air amount through control of the air amount control valve. The air-increasing unit is configured to increase an amount of air drawn into the catalyst by increasing an engine speed in a case in which an anomaly occurs in driving of the air amount control valve when executing the temperature-increase limiting process, the engine speed being a rotation speed of the crankshaft.

In the above-described configuration, when the execution of the fuel cutoff process is requested, an increase in temperature of the catalyst is limited by drawing fresh air into the catalyst. This limits an excessive increase in temperature of the catalyst. Further, in the above-described configuration, when an anomaly occurs in the driving of the air amount control valve, the amount of air drawn into the catalyst to limit an excessive increase in temperature of the catalyst is ensured by increasing the engine speed. That is, when the execution of the fuel cutoff process is requested, even in a case in which an anomaly occurs in the driving of the air amount control valve, an excessive increase in temperature of the catalyst is limited.

Engine oil in the internal combustion engine may be diluted by mixing unburned fuel in the engine oil. The fuel mixed in the engine oil (hereinafter may be referred to as diluted fuel) is vaporized by an increase in temperature of the oil. When the internal combustion engine includes a blow-by gas passage that discharges blow-by gas to the intake passage, blow-by gas is discharged to the intake passage together with fuel vaporized from the engine oil. When the fuel injection is stopped to stop combustion in the cylinder, blow-by gas containing vaporized fuel flows through the exhaust passage to reach the catalyst. When fuel is drawn into the catalyst, the combustion of the fuel increases the temperature of the catalyst. Thus, in the internal combustion engine including the blow-by gas passage, when the fuel injection is stopped to stop combustion in the cylinder, the temperature of the catalyst easily increases so that the temperature of the catalyst may be excessively increased. However, in the internal combustion engine disclosed in the above-described document, the fact that diluted fuel and blow-by gas cause an excessive increase in temperature of the catalyst is not taken into account.

Further, when an anomaly occurs in the configuration of drawing fresh air into the catalyst, in a case in which fresh air drawn into the catalyst is insufficient, the temperature of the catalyst may not be able to be decreased. Taking into account a case in which fuel is drawn into the catalyst by the blow-by gas that has reached the catalyst, in the configuration disclosed in the above-described document, there is still room for improvement of the configuration of limiting an excessive increase in temperature of the catalyst when stopping fuel injection to stop burning fuel in the cylinder. The configuration of Example 1 improves this configuration.

Example 2: In the control device according to Example 1, the vehicle is a hybrid vehicle, the hybrid vehicle including a motor generator capable of inputting an output torque to the crankshaft, and the air-increasing unit is configured to increase, when increasing the engine speed in the temperature-increase limiting process, the engine speed by rotating the crankshaft through driving by the motor generator.

In the case of a hybrid vehicle, the engine speed can be increased with the driving of the motor generator. Thus, in a case in which an anomaly occurs in the driving of the air amount control valve, the amount of air drawn into the catalyst to limit an excessive increase in temperature of the catalyst is ensured. That is, when the execution of the fuel cutoff process is requested, an excessive increase in temperature of the catalyst is limited.

Example 3: In the control device according to Example 1 or 2, the vehicle is a vehicle in which mixed fuel of alcohol and gasoline is used.

In a case in which mixed fuel of alcohol and gasoline is mixed in engine oil to dilute the engine oil, the amount of volatilized diluted fuel is small. When the temperature of the oil is approaching the boiling point of alcohol, the diluted fuel suddenly vaporizes. That is, when the mixed fuel is used, the fuel concentration of the blow-by gas may increase suddenly. Thus, when the fuel cutoff process is executed, an excessive increase in temperature of the catalyst may be caused abruptly. In the vehicle using mixed fuel, the above-described configuration capable of limiting an increase in temperature of the catalyst by ensuring the amount of air drawn into the catalyst even when an anomaly occurs in the driving of the air amount control valve is particularly effective.

Example 4: In the control device according to any one of examples 1 to 3, the air-increasing unit is configured to calculate an altitude of a road surface on which the vehicle is traveling, and increase, when increasing the engine speed in the temperature-increase limiting process, the engine speed as the altitude increases.

When the vehicle is traveling at high altitude, the density of air decreases as the altitude of the road surface increases. Thus, as the altitude of the road surface increases, the intake air amount corresponding to a predetermined engine speed decreases. In the above-described configuration of increasing the engine speed as the altitude of the road surface increases, the amount of air drawn into the catalyst to limit an excessive increase in temperature of the catalyst is ensured. That is, even in a case in which the vehicle is traveling at high altitude, an excessive increase in temperature of the catalyst is limited when the execution of the fuel cutoff process is requested.

Example 5: In the control device according to any one of Examples 1 to 4, the air amount control valve is an intake valve that connects and disconnects the intake passage to and from the cylinder. The internal combustion engine includes a throttle valve arranged in the intake passage and a variable valve mechanism capable of varying a timing of opening and closing the intake valve. The air-increasing unit is configured to, when the execution of the fuel cutoff process is requested, in a case in which no anomaly occurs in the variable valve mechanism, fully open an open degree of the throttle valve and advance the timing of opening and closing the intake valve, and when the execution of the fuel cutoff process is requested, in a case in which an anomaly occurs in the variable valve mechanism, fully open the open degree of the throttle valve and increase the engine speed.

In the above-described configuration, when an anomaly does not occur in the variable valve mechanism, the amount of air drawn into the catalyst can be increased by controlling the throttle valve and the variable valve mechanism. When an anomaly occurs in the variable valve mechanism, the amount of air drawn into the catalyst can be increased by controlling the throttle valve and increasing the engine speed. That is, when the execution of the fuel cutoff process is requested, an excessive increase in temperature of the catalyst is limited by increasing the amount of air drawn into the catalyst.

Example 6: A control method for an internal combustion engine that executes the various processes described in Examples 1 to 5 is provided.

Example 7: A non-transitory computer readable storage medium that stores a program that causes a processor to execute the various processes described in Examples 1 to 5 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A control device 10, which is a control device for a vehicle according to an embodiment of the present disclosure, will now be described with reference to FIGS. 1 to 6.

Figure 1:
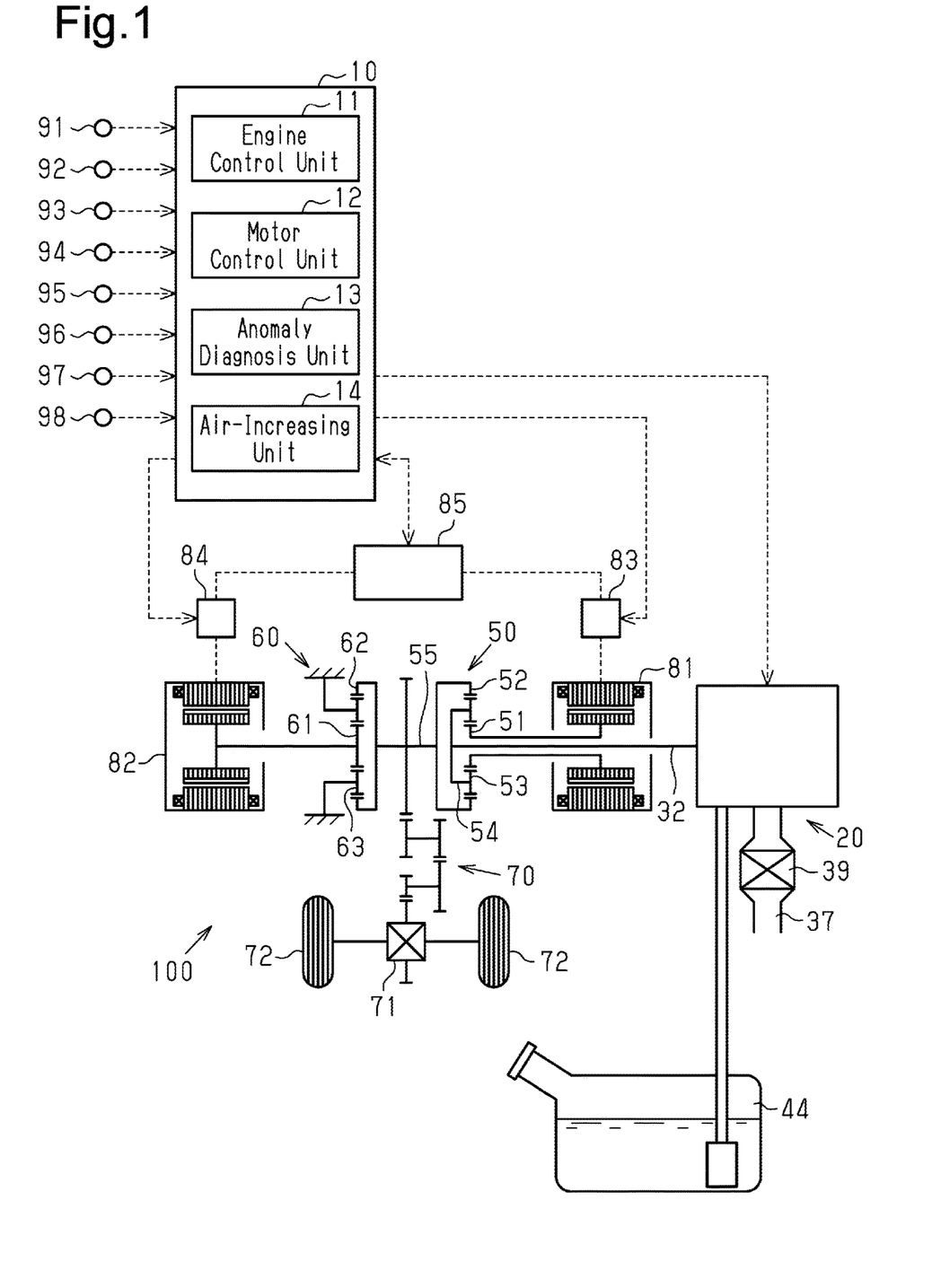
FIG. 1 is a schematic diagram showing a control device for a vehicle and the vehicle controlled by the control device according to an embodiment of the present disclosure.

FIG. 1 shows a vehicle 100 and the control device 10 for the vehicle 100. The vehicle 100 is a hybrid vehicle equipped with an internal combustion engine and a motor generator as drive sources for traveling. The vehicle 100 includes an internal combustion engine 20, a power distribution-integration mechanism 50, and a first motor generator 81. The power distribution-integration mechanism 50 is connected to a crankshaft 32 of the internal combustion engine 20. The first motor generator 81 is connected to the power distribution-integration mechanism 50. The vehicle 100 further includes a second motor generator 82. The second motor generator 82 is coupled to the power distribution-integration mechanism 50 by a reduction gear 60. Drive wheels 72 of the vehicle 100 are coupled to the power distribution-integration mechanism 50 by a reduction drive 70 and a differential 71.

The power distribution-integration mechanism 50 is a planetary gear mechanism. The power distribution-integration mechanism 50 has a first sun gear 51 and a first ring gear 52. The first sun gear 51 is an external gear. The first ring gear 52 is an internal gear coaxially arranged with the first sun gear 51. Pinion gears 53 that mesh with the first sun gear 51 and the first ring gear 52 are provided between the first sun gear 51 and the first ring gear 52. The pinion gears 53 are supported by a carrier 54 so as to be allowed to orbit and rotate. The first motor generator 81 is coupled to the first sun gear 51. The crankshaft 32 is coupled to the carrier 54. A ring gear shaft 55 is connected to the first ring gear 52. The reduction gear 60 and the reduction drive 70 are coupled to the ring gear shaft 55 of the power distribution-integration mechanism 50.

The reduction gear 60 is a planetary gear mechanism. The reduction gear 60 has a second sun gear 61 and a second ring gear 62. The second sun gear 61 is an external gear. The second ring gear 62 is an internal gear coaxially arranged with the second sun gear 61. Pinion gears 63 that mesh with the second sun gear 61 and the second ring gear 62 are provided between the second sun gear 61 and the second ring gear 62. The pinion gears 63 are rotational but are not allowed to orbit. The second motor generator 82 is coupled to the second sun gear 61. The ring gear shaft 55 is connected to the second ring gear 62.

The vehicle 100 includes a first inverter 83, a second inverter 84, and a battery 85 to which both inverters are connected. The first inverter 83 is connected to the first motor generator 81. The second inverter 84 is connected to the second motor generator 82.

When an output of the internal combustion engine 20 is input to the carrier 54 via the crankshaft 32, the output is distributed into the first sun gear 51 and the first ring gear 52. When an output of the internal combustion engine 20 is input to the first motor generator 81, to which the first sun gear 51 is coupled, the vehicle 100 can generate power using the first motor generator 81.

The first motor generator 81 also functions as an electric motor. When the first motor generator 81 functions as an electric motor, the output of the first motor generator 81 is input to the first sun gear 51. The output of the first motor generator 81 input to the first sun gear 51 is distributed to the carrier 54 and the first ring gear 52. The vehicle 100 can rotate the crankshaft 32 using the output of the first motor generator 81 input to the carrier 54. The first motor generator 81 is a motor generator capable of inputting an output torque to the crankshaft 32. In the present embodiment, rotating the crankshaft 32 with the driving of the first motor generator 81 in such a manner is referred to as motoring.

The first motor generator 81 exchanges electric power with the battery 85 via the first inverter 83.

The second motor generator 82 also functions as a power generator. When the vehicle 100 is decelerated, the second motor generator 82 functions as a power generator to produce a regenerative braking force corresponding to the power generation amount of the second motor generator 82.

The second motor generator 82 also functions as an electric motor. When the second motor generator 82 functions as an electric motor, outputs of the second motor generator 82 are input to the drive wheels 72 via the reduction gear 60, the ring gear shaft 55, the reduction drive 70, and the differential 71. That is, the vehicle 100 can travel with the drive wheels 72 rotated through the driving of the second motor generator 82.

The second motor generator 82 exchanges electric power with the battery 85 via the second inverter 84.

As shown in FIG. 1, the vehicle includes a fuel tank 44. The fuel tank 44 stores fuel supplied to the internal combustion engine 20. The vehicle 100 is a flexible fuel vehicle (FFV) capable of using mixed-fuel of alcohol and gasoline. The internal combustion engine 20 can be operated using any one of fuel having an alcohol concentration of 100%, fuel having an alcohol concentration of 0%, and fuel in which alcohol and gasoline are mixed at a certain ratio.

Figure 2:
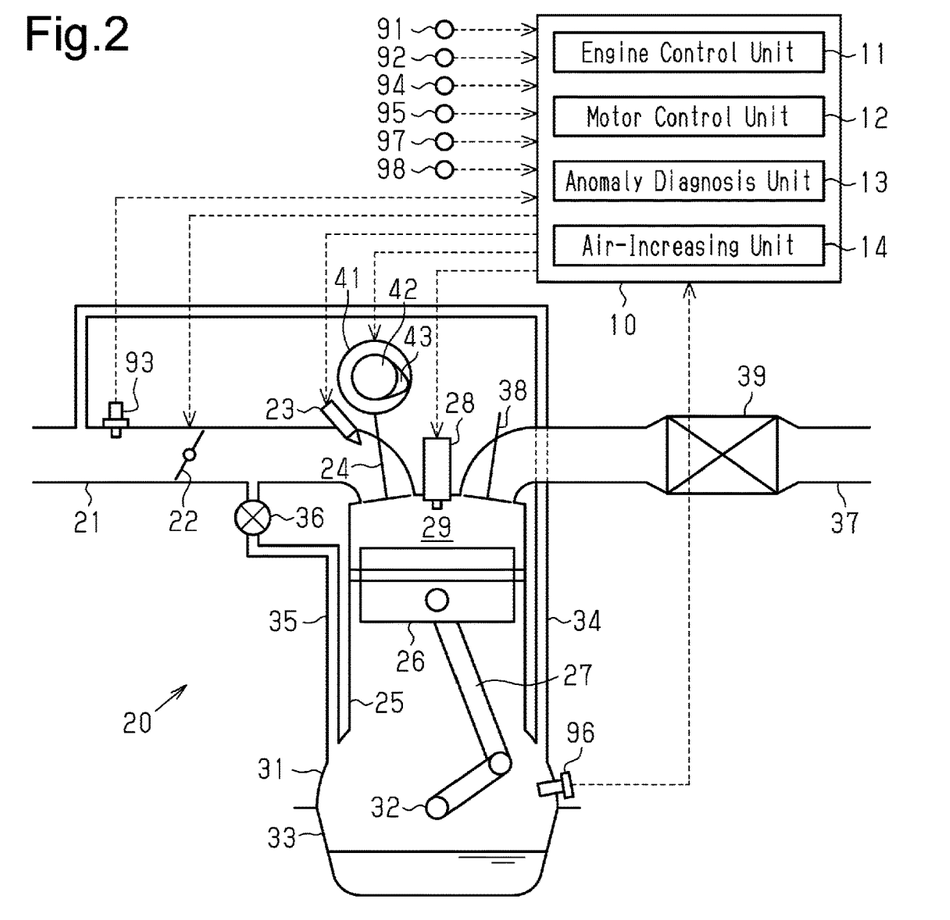
FIG. 2 is a schematic diagram showing the control device of the embodiment and an internal combustion engine of the vehicle in the vehicle of FIG. 1.

As shown in FIG. 2, the internal combustion engine 20 includes a cylinder 25. The internal combustion engine 20 includes a piston 26 accommodated in the cylinder 25. The piston 26 is coupled to the crankshaft 32 by a connecting rod 27. The crankshaft 32 is rotationally supported in a crankcase 31. The piston 26 reciprocates in the cylinder 25 in cooperation with rotation of the crankshaft 32. In the cylinder 25, the upper space above the piston 26 is a combustion chamber 29. The internal combustion engine 20 includes an oil pan 33 that stores engine oil. The oil pan 33 is located on the lower side of the crankcase 31.

The internal combustion engine 20 includes an intake passage 21 through which intake air is drawn into the combustion chamber 29. The internal combustion engine 20 includes a throttle valve 22 arranged in the intake passage 21. The throttle valve 22 adjusts the flow rate of intake air flowing through the intake passage 21 in accordance with the open degree of the throttle valve 22. The internal combustion engine 20 includes a fuel injection valve 23 that injects fuel from the fuel tank 44. The fuel injection valve 23 is arranged on the intake passage 21. The internal combustion engine 20 includes an intake valve 24 that connects and disconnects the intake passage 21 to and from the cylinder 25. The internal combustion engine 20 includes a camshaft 42 that drives the intake valve 24. The intake valve 24 is driven by a cam 43 of the camshaft 42.

The internal combustion engine 20 includes a variable valve mechanism 41. The camshaft 42 is rotated by the rotation power of the crankshaft 32 transmitted via the timing chain and the variable valve mechanism 41. The variable valve mechanism 41 is capable of varying the timing of opening and closing the intake valve 24 by varying the rotation angle of the camshaft 42 relative to the rotation angle of the crankshaft 32. Even if the variable valve mechanism 41 varies the timing of opening and closing the intake valve 24, the period in which the intake valve 24 is open is not varied.

The internal combustion engine 20 includes an ignition device 28 that ignites, with spark discharge, an air-fuel mixture of fuel and intake air drawn into the combustion chamber 29. The internal combustion engine 20 includes an exhaust passage 37 through which the air-fuel mixture burned in the combustion chamber 29 is discharged as exhaust gas. The internal combustion engine 20 includes an exhaust valve 38 that connects and disconnects the cylinder 25 to and from the exhaust passage 37. The internal combustion engine 20 includes a catalyst 39 that purifies exhaust gas flowing through the exhaust passage 37. The catalyst 39 is arranged in the exhaust passage 37.

The internal combustion engine 20 includes a connection passage 34 that connects the crankcase 31 to the intake passage 21. The connection passage 34 is connected to the upstream side of the throttle valve 22 in the intake passage 21. The internal combustion engine 20 includes a blow-by gas passage 35 that connects the crankcase 31 to the intake passage 21. The blow-by gas passage 35 is connected to the downstream side of the throttle valve 22 in the intake passage 21. The blow-by gas passage 35 includes a positive crankcase ventilation (PCV) valve 36. The PCV valve 36 opens when the pressure of the downstream side of the throttle valve 22 in the intake passage 21 becomes lower than the pressure in the crankcase 31. When the PCV valve 36 opens, the blow-by gas leaked from the combustion chamber 29 to the crankcase 31 is discharged through the blow-by gas passage 35 to the intake passage 21, The vehicle 100 and the internal combustion engine 20 include various sensors. FIGS. 1 and 2 show, as the various sensors, a vehicle speed sensor 91, an accelerator position sensor 92, an air flow meter 93, a throttle sensor 94, a cam angle sensor 95, a crank angle sensor 96, a water temperature sensor 97, and an alcohol concentration sensor 98. Detection signals from the sensors are input to the control device 10.

Based on the detection signal input from the vehicle speed sensor 91, the control device 10 calculates a vehicle speed VS as the movement speed of the vehicle 100. Based on the detection signal input from the accelerator position sensor 92, the control device 10 calculates an accelerator position AC as the operation amount of the accelerator pedal. Based on the detection signal input from the air flow meter 93, the control device 10 calculates an intake air amount GA as the amount of air passing through the intake passage 21. Based on the detection signal input from the throttle sensor 94, the control device 10 calculates a throttle open degree TA as the open degree of the throttle valve 22.

Based on the detection signal input from the cam angle sensor 95, the control device 10 calculates a rotation angle of the camshaft 42. Based on the detection signal input from the crank angle sensor 96, the control device 10 detects the rotation angle of the crankshaft 32 to calculate an engine speed NE. Based on the detection signal input from the water temperature sensor 97, the control device 10 calculates a coolant temperature TW as the temperature of coolant circulating in a water jacket of the internal combustion engine 20. Based on the detection signal input from the alcohol concentration sensor 98, the control device 10 calculates an alcohol concentration AL of fuel supplied to the internal combustion engine 20.

The control device 10 includes, as functional units, an engine control unit 11 and a motor control unit 12. The engine control unit 11 controls the internal combustion engine 20. The motor control unit 12 controls the first and second motor generators 81 and 82. The control device 10 further includes, as functional units, an anomaly diagnosis unit 13 and an air-increasing unit 14. The anomaly diagnosis unit 13 executes a process that diagnoses an anomaly in the variable valve mechanism 41. The air-increasing unit 14 executes a temperature-increase limiting process that limits an excessive increase in temperature of the catalyst 39.

Based on, for example, the accelerator position AC, the intake air amount GA, and the engine speed NE, the engine control unit 11 calculates a requested injection amount as a requested value of fuel injected from the fuel injection valve 23. The engine control unit 11 has the fuel injection valve 23 perform fuel injection based on the requested injection amount. To cause the air-fuel mixture to burn in the cylinder 25, the engine control unit 11 has the ignition device 28 perform spark discharge at a timing at which the piston 26 reaches the vicinity of the compression top dead center.

When a fuel cutoff condition is satisfied, a fuel cutoff process is executed. The fuel cutoff process is to stop fuel injection from the fuel injection valve 23 when stopping combustion in the cylinder 25 in a case in which the vehicle 100 is traveling and the crankshaft 32 of the internal combustion engine 20 is rotating. It is determined that the fuel cutoff condition is satisfied when, for example, the accelerator position AC is 0 and the vehicle speed VS is greater than or equal to a given speed. In this case, it is determined that the fuel cutoff condition is not satisfied when the accelerator position AC is greater than or equal to 0 and reacceleration of the vehicle 100 is requested or when the vehicle speed VS is lower than a given return speed.

When the fuel cutoff condition shifts from a non-satisfied state of the fuel cutoff condition to a satisfied state of the fuel cutoff condition, the engine control unit 11 requests for the execution of the fuel cutoff process. The engine control unit 11 stops the spark discharged performed by the ignition device 28 to stop the fuel injection from the fuel injection valve 23. When the spark discharge and the fuel injection are stopped, the combustion of air-fuel mixture in the cylinder 25 is stopped. When the fuel cutoff condition shifts from the satisfied state to the non-satisfied state, the engine control unit 11 resumes the spark discharge performed by the ignition device 28 and resumes the fuel injection from the fuel injection valve 23.

The engine control unit 11 controls the timing of opening and closing the intake valve 24 (i.e., control the valve timing) through driving of the variable valve mechanism 41. The engine control unit 11 sets an advancement amount with reference to the most retarded position of the valve timing and drives the variable valve mechanism 41 based on the advancement amount. When the valve timing is set to the most retarded position, the timing of closing the intake valve 24 is set to be more retarded than the timing of the intake bottom dead center.

The motor control unit 12 controls the driving of the first motor generator 81 and the second motor generator 82. The motor control unit 12 can perform motoring by causing the first motor generator 81 to function as an electric motor.

The anomaly diagnosis unit 13 executes a diagnosis process that detects an anomaly in the variable valve mechanism 41. The anomaly diagnosis unit 13 detects an anomaly in the variable valve mechanism 41 based on the difference between an estimated value of the cam angle of the cam 43 calculated from the advancement amount for driving the variable valve mechanism 41 and an actual cam angle calculated based on the detection signal from the cam angle sensor 95. For example, when the difference between the estimated angle and the actual cam angle is greater than or equal to a determination value, the anomaly diagnosis unit 13 detects an anomaly in the variable valve mechanism 41. When detecting an anomaly in the variable valve mechanism 41, the anomaly diagnosis unit 13 sets a variable valve timing (VVT) anomaly flag to ON.

The air-increasing unit 14 executes the temperature-increase limiting process that limits an excessive increase in temperature of the catalyst 39. An excessive increase in temperature of the catalyst 39 means that the temperature of the catalyst 39 exceeds an activation temperature and becomes excessive. When the condition for starting the fuel cutoff process is satisfied and the execution of the fuel cutoff process is requested, the air-increasing unit 14 increases the intake air amount GA. An increase in the intake air amount GA increases fresh air drawn into the catalyst 39 of the exhaust passage 37. The amount of air drawn into the catalyst 39 through the temperature-increase limiting process is referred to as a catalyst drawn air amount.

The air-increasing unit 14 determines that the condition for starting the temperature-increase limiting process is satisfied when the following conditions (A), (B), and (C) are all satisfied.

(A) A dilution amount DA, which is an estimated value of diluted fuel, is greater than or equal to a given dilution threshold value DAth.
(B) The coolant temperature TW is greater than or equal to a given temperature threshold value TWth.
(C) The alcohol concentration AL is greater than or equal to a given concentration threshold value ALth.

As the fuel concentration in engine oil increases, the fuel concentration in blow-by gas increases more easily when diluted fuel, which is fuel mixed in the engine oil, is vaporized. Thus, the condition for starting the temperature-increase limiting control includes a condition in which the dilution amount DA is greater than or equal to the given dilution threshold value DAth. The dilution threshold value DAth is set as a value at which an excessive increase in temperature of the catalyst 39 may be caused by vaporized diluted fuel when the dilution amount DA is greater than or equal to the dilution threshold value DAth.

The dilution amount DA is calculated by the air-increasing unit 14 as the sum of an addition amount calculated as the amount of fuel mixed in engine oil and a subtraction amount calculated as the amount of fuel vaporized from engine oil. The addition amount can be calculated based on, for example, an integration value of the fuel injection amount during a period of calculating the addition amount. The subtraction amount can be calculated from the coolant temperature TW.

As the temperature of engine oil becomes higher, diluted fuel, which is fuel mixed in engine oil, is vaporized more easily. That is, as the temperature of engine oil becomes higher, fuel is discharged more easily from the internal combustion engine 20 to the intake passage 21 with blow-by gas. Further, when the coolant temperature TW is high, the temperature of engine oil is predicted to be high. Thus, the condition for starting the temperature-increase limiting control includes a condition in which the coolant temperature TW is greater than or equal to the given temperature threshold value TWth. The temperature threshold value TWth is set as a value that allows to predict that the temperature of engine oil has increased to a temperature at which diluted fuel is easily vaporized when the coolant temperature TW is greater than or equal to the temperature threshold value TWth.

As the alcohol concentration AL becomes higher, the amount of diluted fuel volatilized from engine oil becomes smaller and the amount of diluted fuel vaporized from engine oil increases more easily at a temperature close to the boiling point of alcohol. As the alcohol concentration AL becomes higher, the fuel concentration in blow-by gas increases more suddenly. Thus, the condition for starting the temperature-increase limiting control includes a condition in which the alcohol concentration AL is greater than or equal to the given concentration threshold value ALth. The concentration threshold value ALth is set as a value at which diluted fuel that is suddenly vaporized causes an excessive increase in temperature of the catalyst 39 when the alcohol concentration AL is greater than or equal to the concentration threshold value ALth.

When executing the temperature-increase limiting process, the air-increasing unit 14 first increases the throttle open degree TA by driving the throttle valve 22 to the open side. For example, the throttle open degree TA is fully opened. Next, the air-increasing unit 14 advances the valve timing of the intake valve 24 with the driving of the variable valve mechanism 41. When an anomaly is detected in the variable valve mechanism 41, the air-increasing unit 14 requests the motor control unit 12 to execute motoring.

The air-increasing unit 14 stores a requested air amount GAt as a target value of the intake air amount GA that ensures the catalyst drawn air amount, which is used to limit an excessive increase in temperature of the catalyst 39. The requested air amount GAt is set to a value that has been obtained in advance through experiments or the like. The air-increasing unit 14 executes the temperature-increase limiting process based on the requested air amount GAt.

The air at high altitudes has a smaller density than the air at a flat ground. Thus, when motoring is executed to draw fresh air into the catalyst 39, the intake air amount GA corresponding to a predetermined engine speed NE decreases as the altitude of a road surface on which the vehicle 100 is traveling increases. In the present embodiment, even when the vehicle 100 is traveling at high altitude, the requested air amount GAt is ensured in the temperature-increase limiting process. Thus, the target value of the engine speed NE during the execution of motoring is set based on the map that stores the relationship shown in FIG. 3.

Figure 3:
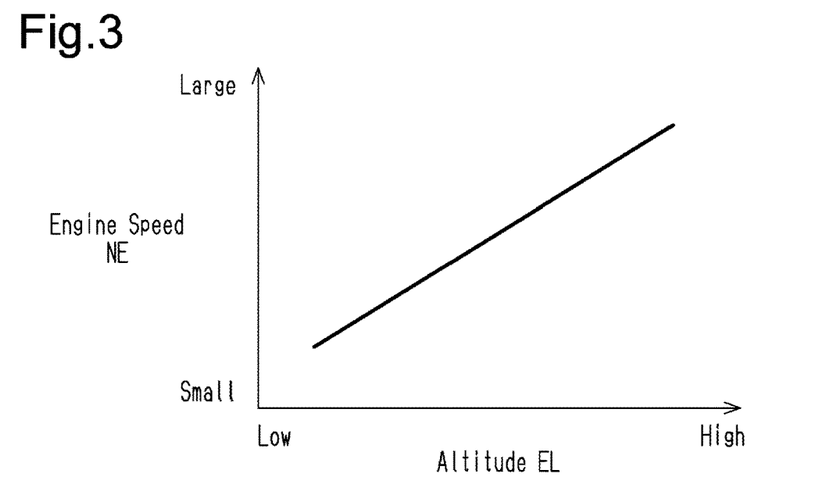
FIG. 3 is a graph showing the relationship of the altitude and the engine speed with respect to the intake air amount in a temperature-increase limiting process executed by the control device of the embodiment in the vehicle of FIG. 1.

FIG. 3 shows the relationship of the altitude EL and the engine speed NE that cause the intake air amount GA drawn into the catalyst 39 by executing motoring to follow the requested air amount GAt. As shown in FIG. 3, as the altitude EL increases, the requested value of the engine speed NE increases. Based on such a map, the target value of the engine speed NE during the execution of motoring is set to be higher as the altitude EL becomes higher. The altitude EL is calculated by the air-increasing unit 14. The air-increasing unit 14 uses, for example, the throttle open degree TA and the engine speed NE to calculate an intake air amount that is predicted when the vehicle is traveling on the road surface at a reference altitude. The air-increasing unit 14 is capable of calculating the altitude EL based on the difference between the predicted intake air amount and the intake air amount GA that is calculated based on the detection signal input from the air flow meter 93. The relationship of the difference in intake air amount and the altitude EL is stored in the air-increasing unit 14. As the intake air amount GA becomes smaller than the predicted intake air amount, the altitude EL is calculated to be higher.

As described above, in the temperature-increase limiting process, the air-increasing unit 14 increases the throttle open degree TA and executes the advancement process of the valve timing of the intake valve 24 or executes motoring so that the intake air amount GA during the execution of the fuel cutoff process increases, thereby increasing the catalyst drawn air amount.

Figure 4:
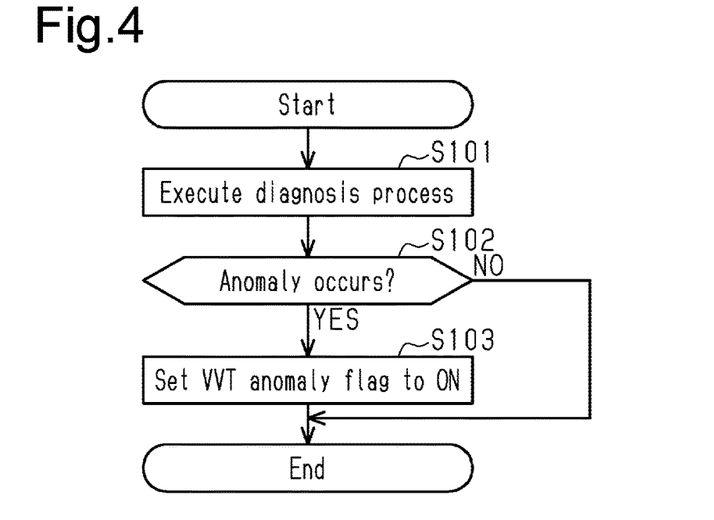
FIG. 4 is a flowchart illustrating the flow of processes when the control device of the embodiment executes a diagnosis process in the vehicle of FIG. 1.

The flow of processes when the anomaly diagnosis unit 13 executes the diagnosis process will be described with reference to FIG. 4. The processing routine is repeatedly executed in predetermined cycles.

When the processing routine is started, in step S101, the anomaly diagnosis unit 13 first executes the diagnosis process that detects an anomaly in the variable valve mechanism 41. After the diagnosis process is executed, the process is advanced to step S102. In the process of step S102, when an anomaly is not detected in the variable valve mechanism 41 through the diagnosis process executed in step S101, that is, when there is no anomaly (S102: NO), the processing routine is temporarily ended.

When an anomaly is detected in the variable valve mechanism 41, that is, when there is an anomaly (S102: YES), the process is advanced to step S103. In step S103, the anomaly diagnosis unit 13 sets the VVT anomaly flag to ON. Subsequently, the processing routine is ended.

The flow of processes when the air-increasing unit 14 executes the temperature-increase limiting process of the catalyst 39 will be described with reference to FIG. 5. The processing routine is repeatedly executed in predetermined cycles.

When the processing routine is started, in step S201, the air-increasing unit 14 first determines whether the condition for starting the temperature-increase limiting process is satisfied. When the condition for starting the temperature-increase limiting process is not satisfied (S201: NO), the processing routine is temporarily ended. When the condition for starting the temperature-increase limiting process is satisfied (S201: YES), the process is advanced to step S202. In step S202, the air-increasing unit 14 determines whether the engine control unit 11 requests for the execution of the fuel cutoff process. When the execution of the fuel cutoff process is not requested (S202: NO), the processing routine is ended. When the execution of the fuel cutoff process is requested (S202: YES), the process is advanced to step S203.

In step S203, the air-increasing unit 14 starts executing the temperature-increase limiting process by driving the throttle valve 22 to the open side. Subsequently, the process is advanced to step S204. In step S204, the air-increasing unit 14 determines whether the VVT anomaly flag is set to ON. When the VVT anomaly flag is OFF (S204: NO), the process is advanced to step S205. In step S205, the air-increasing unit 14 advances the timing of opening and closing the intake valve 24 by driving the variable valve mechanism 41. Subsequently, the processing routine is ended.

When the VVT anomaly flag is ON (S204: YES), the process is advanced to step S206. In step S206, the air-increasing unit 14 requests the motor control unit 12 to execute motoring. Subsequently, the processing routine is ended.

The operation of the present embodiment will now be described.

Figure 6:
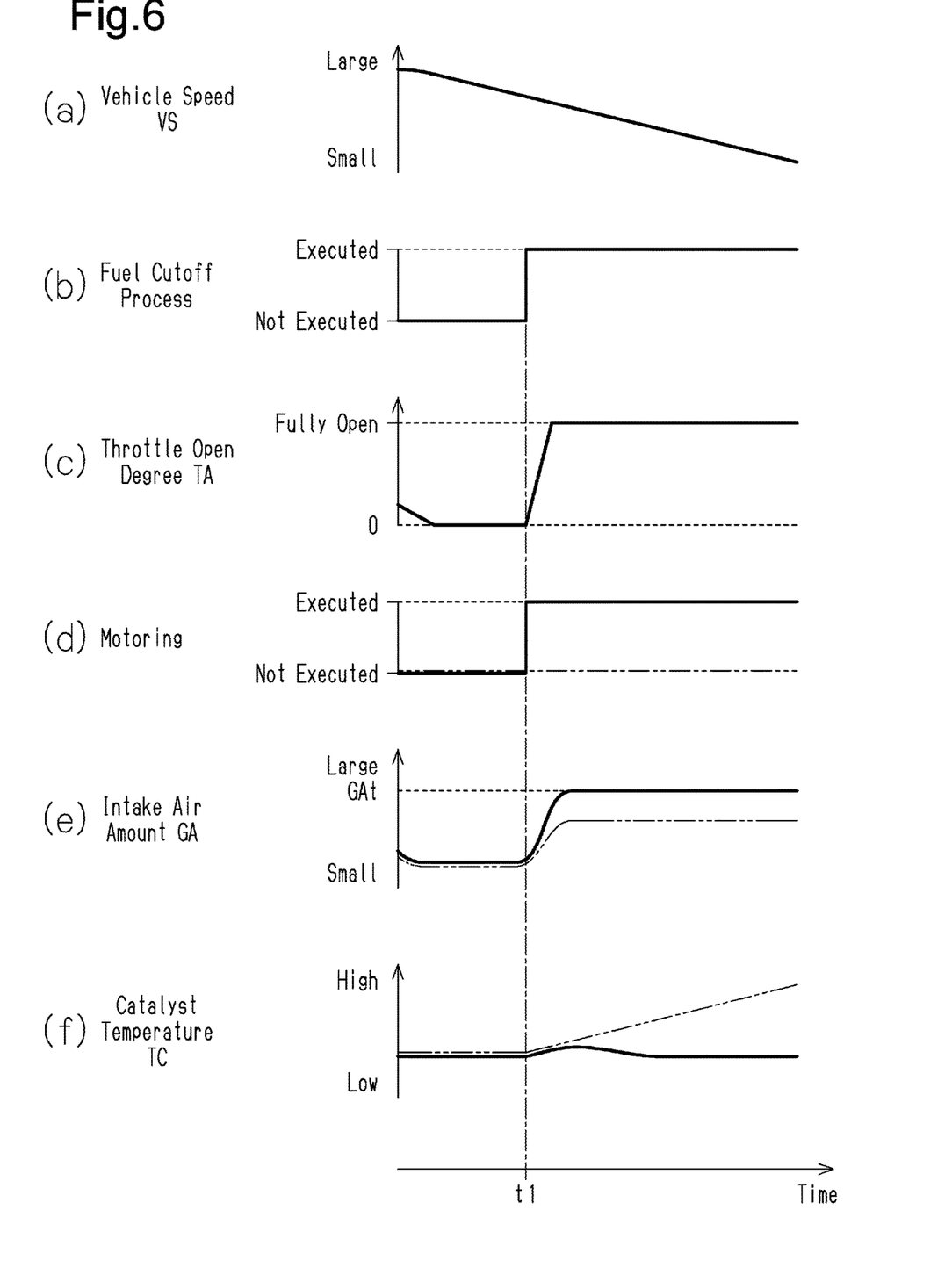
FIG. 6 is a timing chart that includes sections (a) to (f), each illustrating the state of the vehicle when the control device of the embodiment executes the temperature-increase limiting process in the vehicle of FIG. 1.

FIG. 6 shows an example in which the fuel cutoff condition is satisfied and the execution of the fuel cutoff process is requested when the vehicle 100 is decelerating as shown in section (a) of FIG. 6. As shown in section (b) of FIG. 6, the execution of the fuel cutoff process is started at a timing t1. In the example shown in FIG. 6, the diagnosis process is performed to detect an anomaly in the variable valve mechanism 41, and the VVT anomaly flag is set to ON.

When the execution of the temperature-increase limiting process is started at timing t1, the air-increasing unit 14 controls the throttle valve 22 to the open side (S203). As shown in section (c) of FIG. 6, the throttle open degree TA is increased to be fully open.

Further, when an anomaly is detected in the variable valve mechanism 41, the air-increasing unit 14 requests the motor control unit 12 to execute motoring (S206). As shown by the solid line in section (d) of FIG. 6, the execution of the motoring is started at timing t1. When the execution of the motoring is started, the first motor generator 81 is driven. When an output of the first motor generator 81 is input to the crankshaft 32, the engine speed NE is increased.

When the execution of the motoring is started at timing t1, the engine speed NE increases so that the intake air amount GA increases as shown by the solid line in section (e) of FIG. 6. The intake air amount GA increases to the requested air amount GAt, which is set by the air-increasing unit 14.

When the intake air amount GA increases during the execution of the fuel cutoff process, the catalyst drawn air amount drawn into the catalyst 39 of the exhaust passage 37 increases. Thus, as shown by the solid line in section (e) of FIG. 6, although the catalyst temperature TC is temporarily increased subsequent to timing t1 by drawing fuel vaporized from engine oil into the catalyst 39, an increase in the catalyst temperature TC is limited by an increase in the catalyst drawn air amount. The catalyst temperature TC can be calculated based on the intake air amount GA and the fuel injection amount.

FIG. 6 also shows a comparative example. In this comparative example, as shown by the long dashed double-short dashed line in section (d) of FIG. 6, motoring is not executed although an anomaly is detected in the variable valve mechanism 41. In the comparative example, the throttle valve 22 is controlled in the same manner as the example shown by the solid line, and the throttle open degree TA is fully open. In the comparative example, as shown by the long dashed double-short dashed line in section (e) of FIG. 6, since motoring is not executed, the intake air amount GA does not reach the requested air amount GAt. That is, in the comparative example, since the intake air amount GA is smaller than the requested air amount GAt, the catalyst drawn air amount is insufficient. Thus, in the comparative example, an increase in the catalyst temperature TC is not limited easily. Therefore, as shown by the long dashed double-short dashed line in section (f) of FIG. 6, the catalyst temperature TC of the comparative example continues to increase subsequent to timing t1. Accordingly, the catalyst temperature TC of the comparative example may increase excessively.

The advantages of the embodiment will now be described.

(1) As shown by the long dashed double-short dashed line as a comparative example, the intake air amount GA is small when the throttle open degree TA is just set to be fully open in the temperature-increase limiting process in a case in which an anomaly occurs in the variable valve mechanism 41. Thus, since the catalyst drawn air amount is insufficient, an increase in the catalyst temperature TC may not be able to be limited.

In the control device 10 of the embodiment, when an anomaly occurs in the variable valve mechanism 41, the air-increasing unit 14 requests for the execution of motoring in the temperature-increase limiting process. When the motoring is performed to increase the engine speed NE, the intake air amount GA increases. This ensures the amount of air drawn into the catalyst 39 to limit an excessive increase in temperature of the catalyst 39. That is, when the execution of the fuel cutoff process is requested, even in a case in which an anomaly occurs in the variable valve mechanism 41, an excessive increase in temperature of the catalyst 39 can be limited through the temperature-increase limiting process.

(2) In a vehicle in which mixed fuel of alcohol and gasoline is used, when the fuel cutoff process is executed, an excessive increase in temperature of the catalyst may be caused abruptly. In the control device 10 of the embodiment, when the execution of the fuel cutoff process is requested, even in a case in which an anomaly occurs in the variable valve mechanism 41, an excessive increase in temperature of the catalyst 39 can be limited through the temperature-increase limiting process. Such a configuration is particularly effective for the vehicle 100, in which mixed fuel is used.

(3) When executing motoring in the temperature-increase limiting process, the control device 10 uses the altitude EL to set the target value of the engine speed NE for ensuring the requested air amount GAt. This allows the catalyst drawn air amount to be ensured even when the vehicle 100 is traveling at high altitude. Thus, an excessive increase in temperature of the catalyst 39 can be limited.

(4) In the control device 10, motoring is executed to ensure the catalyst drawn air amount. Thus, in the control device 10, even if the fuel cutoff process is executed for a long period, air can continue to be drawn into the catalyst 39.

(5) In the control device 10, when no anomaly occurs in the variable valve mechanism 41, the valve timing of the intake valve 24 is advanced in the temperature-increase limiting process. That is, the timing of closing the intake valve 24 is hastened. This limits situations in which the intake air drawn from the intake passage 21 to the cylinder 25 is blown back from the cylinder 25 to the intake passage 21. Thus, since the catalyst drawn air amount is increased, an excessive increase in temperature of the catalyst 39 can be limited.

(6) In order to limit an excessive increase in temperature of the catalyst 39, even if the execution of the fuel cutoff process is requested, the execution of the fuel cutoff process may be inhibited. That is, the fuel vaporized from engine oil and discharged to the intake passage 21 may be burned in the combustion chamber 29. However, if the execution of the fuel cutoff process is inhibited, a braking force generated through engine braking while the vehicle 100 is decelerating, the degree of deceleration of the vehicle 100 may be small.

The control device 10 of the embodiment executes the fuel cutoff process and the temperature-increase limiting process to increase the catalyst drawn air amount, thereby limiting an excessive increase in temperature of the catalyst 39. This allows the control device 10 to limit an excessive increase in temperature of the catalyst 39 while limiting a decrease in a braking force generated through engine braking while the vehicle 100 is decelerating.

The correspondence between the items in the above embodiments and the items described in the above-described SUMMARY is as follows.

The "air amount control valve that changes an intake air amount drawn into the cylinder" described in Example 1 corresponds to the intake valve 24. Further, "in a case in which an anomaly occurs in driving of the air amount control valve" corresponds to a case in which an anomaly occurs in the variable valve mechanism 41, which varies the valve timing of the intake valve 24.

The present embodiment may be modified as follows. The present embodiment and the following modifications can be combined as long as the combined modifications remain technically consistent with each other.

In the diagnosis process executed by the anomaly diagnosis unit 13 in the above-described embodiment, an anomaly in the variable valve mechanism 41 may be determined in more detail. The mode of controlling the temperature-increase limiting process executed by the air-increasing unit 14 may be changed in accordance with the result of the diagnosis process.

For example, in a case in which the anomaly diagnosis unit 13 detects the occurrence of an anomaly of the variable valve mechanism 41 adhering with a small advancement amount of the variable valve mechanism 41, the timing of opening and closing the intake valve 24 is fixed to a retarded side. Thus, the intake air amount GA tends to decrease. Thus, in this case, it is preferred that the air-increasing unit 14 further increase a target value of the engine speed NE that is increased through motoring.

In contrast, in a case in which the anomaly diagnosis unit 13 detects the occurrence of an anomaly of the variable valve mechanism 41 adhering with a large advancement amount of the variable valve mechanism 41, the timing of opening and closing the intake valve 24 is fixed to an advanced side. In this case, the air-increasing unit 14 may reduce the target value of the engine speed NE, which is increased through motoring.

Additionally, in a case in which the anomaly diagnosis unit 13 detects the occurrence of an anomaly where the timing of opening and closing the intake valve 24 tends to be retarded due to load or the like during driving of the variable valve mechanism 41, it is preferred that the intake valve 24 further increase the target value of the engine speed NE, which is increased through motoring.

The execution of the temperature-increase limiting process in the above-described embodiment may be started when the fuel cutoff process is requested. For instance, in the example shown in FIG. 6, the temperature-increase limiting process may be started from timing t1 and the execution of the fuel cutoff process may be started at the point in time subsequent to timing t1. Such a configuration of increasing the intake air amount GA prior to starting the execution of the fuel cutoff process increases fresh air drawn into the catalyst 39 before the fuel vaporized from engine oil is drawn into the catalyst 39. Such a configuration also reduces the catalyst temperature TC. Such a mode can limit an excessive increase in temperature of the catalyst 39.

In the above-described embodiments, conditions (A) to (C) described as the conditions for starting the temperature-increase limiting process are examples of the starting conditions. Instead, for example, one of the conditions for starting the temperature-increase limiting process may be that an oil temperature TO serving as the temperature of an engine oil is greater than or equal to a given oil temperature threshold value. The oil temperature TO can be calculated based on the coolant temperature TW. Alternatively, an oil temperature sensor that detects the temperature of engine oil may be employed. The oil temperature TO can also be calculated based on a detection signal from the oil temperature sensor.

In the above-described embodiment, the air-increasing unit 14 calculates the dilution amount DA. To execute the temperature-increase limiting process, the air-increasing unit 14 uses the calculated dilution amount DA. In a modification, instead of executing the temperature-increase limiting process based on the dilution amount DA, which is an estimated value of diluted fuel, the air-increasing unit 14 may estimate the amount of fuel diluted from engine oil and execute the temperature-increase limiting process based on the estimated vaporization amount. The amount of fuel vaporized from engine oil can be calculated based on, for example, the dilution amount DA and the temperature of engine oil. In this configuration, the same advantage as that of the above-described embodiment can be provided.

Figure 5:
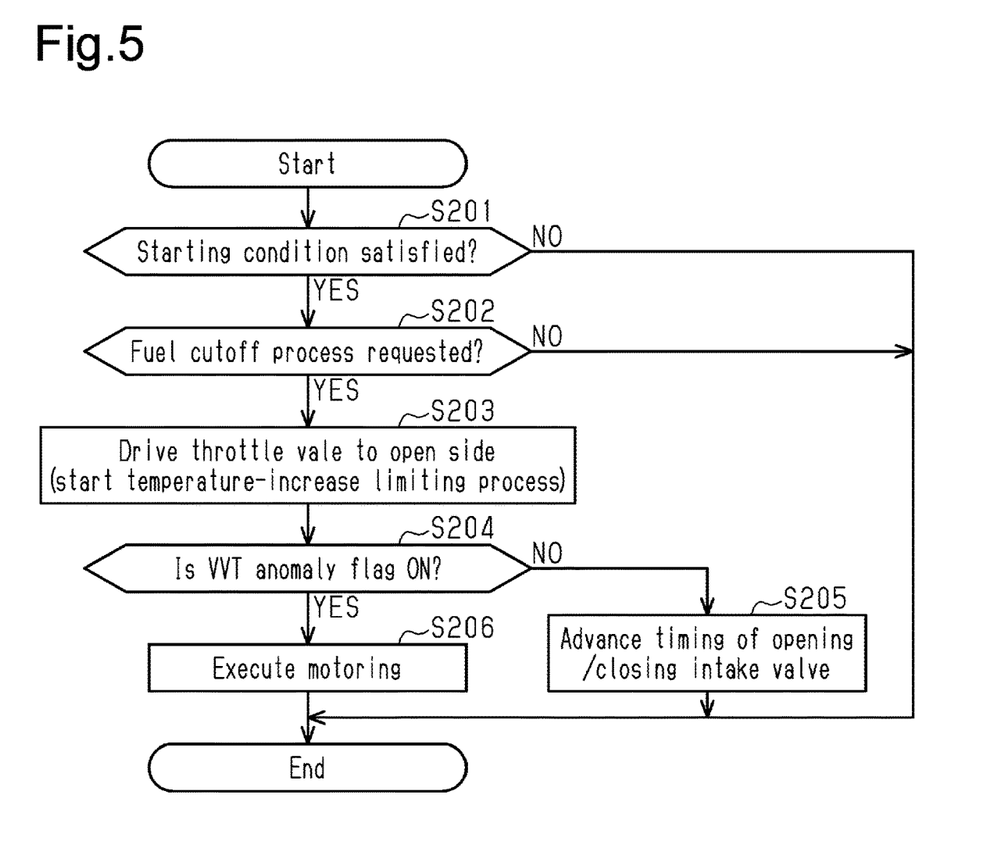
FIG. 5 is a flowchart illustrating the flow of processes when the control device of the embodiment executes the temperature-increase limiting process in the vehicle of FIG. 1.

In the above-described embodiment, the above-described embodiment determines in the process of step S202 shown in FIG. 5 that the engine control unit 11 requests for the execution of the fuel cutoff process. Instead, when the engine control unit 11 requests for the execution of the fuel cutoff process, a fuel cutoff (FC) request flag may be set to ON in the flow of processes that differ from the processing routine shown in FIG. 5. In step S202, the air-increasing unit 14 may determine whether the FC request flag is set to ON. In a configuration in which the process is advanced to step S203 when the FC request flag is set to ON, the same advantage as that of the above-described embodiment can be provided.

In the above-described embodiment, the given requested air amount GAt is set in the temperature-increase limiting process. Instead, the value of the requested air amount GAt may be changed.

Figure 7:
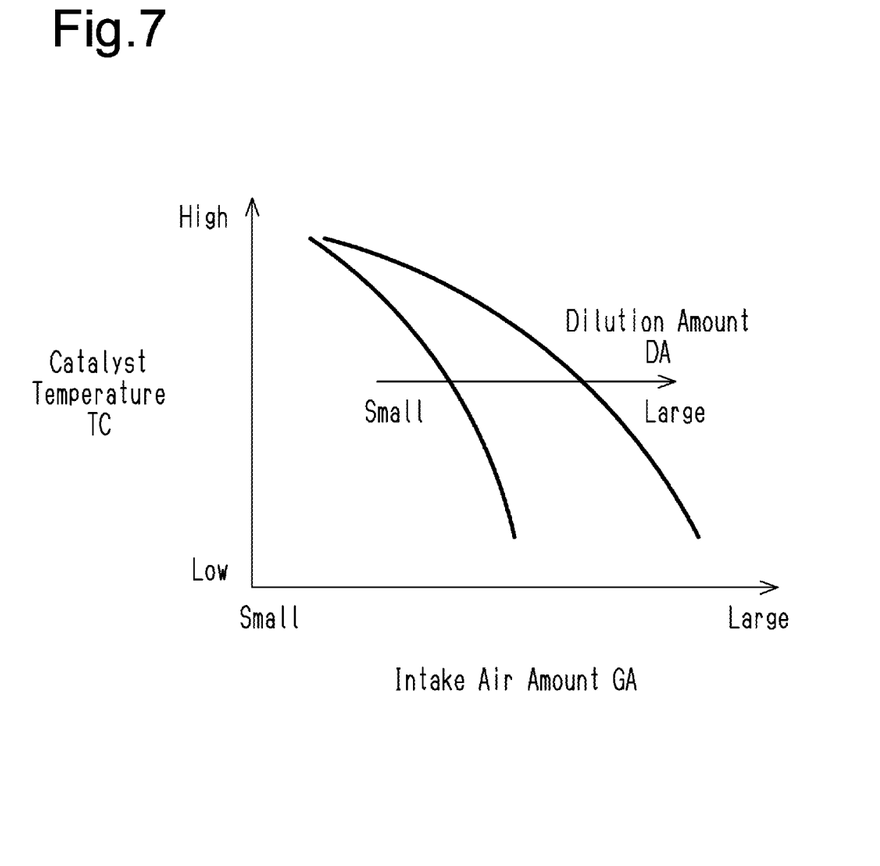
FIG. 7 is a graph showing how the relationship of the intake air amount and the catalyst temperature is affected by the amount of fuel that dilutes engine oil in the temperature-increase limiting process executed by a control device for a vehicle according to a modification.

FIG. 7 shows the relationship of the intake air amount GA and the catalyst temperature TC with respect to the dilution amount DA when the temperature-increase limiting process is executed. As shown in FIG. 7, even if the intake air amount GA is increased, a decrease in the catalyst temperature TC is limited to a larger extent when the dilution amount DA is large than when the dilution amount DA is small. That is, FIG. 7 indicates that even if the intake air amount GA increases, the gradient of a decrease in the catalyst temperature TC is more gentle when the dilution amount DA is large than when the dilution amount DA is small. Such a tendency occurs probably because the fuel concentration in blow-by gas tends to increase when the dilution amount DA is large. When the fuel concentration in blow-by gas tends to increase during the execution of the fuel cutoff process, the temperature of the catalyst 39 easily increases and thus the catalyst temperature TC easily increases.

Thus, the air-increasing unit 14 may increase the requested air amount GAt as the dilution amount DA increases. That is, when the catalyst drawn air amount is increased by executing motoring, the engine speed NE is increased as the dilution amount DA increases. This limits an increase in the catalyst temperature TC even when the dilution amount DA is large. Thus, an excessive increase in temperature of the catalyst 39 is limited.

In the above-described embodiment, the air-increasing unit 14 advances the timing of opening and closing the intake valve 24 by driving the variable valve mechanism 41 in the temperature-increase limiting process. The control of the intake valve 24 that can be varied by the variable valve mechanism 41 does not have to be performed in this manner. The air-increasing unit 14 may control the intake valve 24 such that the intake air amount GA increases. For example, the intake valve 24 can be increased by using the variable valve mechanism 41 that can vary the open period and the lift amount of the intake valve 24.

In the above-described embodiment, when an anomaly occurs in the variable valve mechanism 41 in the temperature-increase limiting process, the air-increasing unit 14 increases the intake air amount GA by increasing the engine speed NE through motoring. Instead, in the temperature-increase limiting process, when an anomaly occurs such that, for example, the throttle open degree TA of the throttle valve 22 does not become fully open, the intake air amount GA may be increased by increasing the engine speed NE through motoring. In this case, the anomaly diagnosis unit 13 detects an anomaly in the throttle valve 22. When an anomaly occurs in the throttle valve 22, the intake air amount GA may decrease. In the above-described configuration, in the same manner as the above-described embodiment, when the execution of the fuel cutoff process is requested, the advantage of limiting an excessive increase in temperature of the catalyst 39 is provided.

In the configuration of the above-described modification, the "air amount control valve that changes an intake air amount drawn into the cylinder" in Example 1 corresponds to the throttle valve 22. Further, "in a case in which an anomaly occurs in driving of the air amount control valve" corresponds to a case in which an anomaly occurs in the driving of the throttle valve 22.

In the above-described embodiment, when executing motoring in the temperature-increase limiting process, the air-increasing unit 14 sets the target value of the engine speed NE based on the altitude EL. Instead, the target value of the engine speed NE may be set to a given rotation speed regardless of whether the altitude EL is high or low. For example, assuming in advance that the vehicle 100 is traveling at high altitude, the given rotation speed can be set as the engine speed NE at which the requested air amount GAt is ensured at the high altitude.

The above-described embodiment includes, as an example of calculating the altitude EL, an example in which the air-increasing unit 14 calculates the altitude EL by comparing the intake air amount GA with a predicted intake air amount. The altitude EL does not have to be calculated in this manner. For example, the air-increasing unit 14 may obtain position information of the vehicle 100 and then obtain the altitude EL based on the position information and map information that includes the information related to the altitude of a road surface.

In the above-described embodiment, the internal combustion engine 20 includes the fuel injection valve 23, which is arranged on the fuel injection valve 23. The internal combustion engine 20 may include, as a fuel injection valve, a direct injection valve that directly injects fuel injection valve into the combustion chamber 29.

In the above-described embodiment, the vehicle 100 controlled by the control device 10 is a FFV in which mixed fuel of alcohol and gasoline is used. The control device 10 is not limited to a FFV and may be applied to a vehicle in which gasoline fuel is used. Even if the fuel to be used is gasoline fuel, when vaporized fuel is drawn into the catalyst 39 during the execution of the fuel cutoff process, the temperature of the catalyst 39 may excessively increase. As the fuel concentration in air containing vaporized fuel increases, the temperature of the catalyst 39 increases more easily. That is, even in a case in which the control device 10 of the embodiment is applied to a vehicle in which gasoline fuel is used, in the same manner as the above-described embodiment, the advantage of limiting an excessive increase in temperature of the catalyst 39 is provided when the execution of the fuel cutoff process is requested.

In the above-described embodiment, the vehicle 100 is shown in FIG. 1 as an example of a hybrid vehicle. Instead, the hybrid vehicle to which the control device 10 is applied simply needs to include a motor generator capable of inputting an output torque to the crankshaft 32 of the internal combustion engine 20. A system that differs from the system of the vehicle 100 may be employed.

In the above-described embodiment, when an anomaly occurs in the variable valve mechanism 41 in the temperature-increase limiting process, the air-increasing unit 14 increases the intake air amount GA by increasing the engine speed NE through motoring. Instead, as long as the engine speed NE can be increased when an anomaly occurs in the variable valve mechanism 41, motoring does not have to be used to increase the engine speed NE. For example, when an anomaly occurs in the variable valve mechanism 41, the engine speed NE can be increased by increasing the gear ratio of a variable-speed mechanism.

Figure 8:
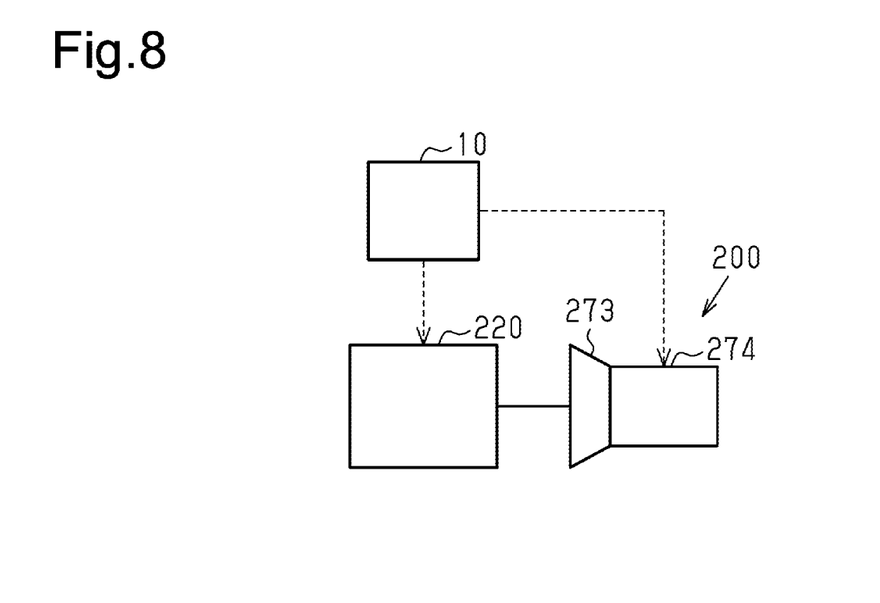
FIG. 8 is a schematic diagram showing a control device for a vehicle and the vehicle controlled by the control device according to another modification.

FIG. 8 illustrates a vehicle 200 having an internal combustion engine 220 as a power source. The vehicle 200 includes a torque converter 273 and an automatic transmission 274. The control device 10 is a control device for the vehicle 200. In this case, instead of executing motoring in the process of step S206 shown in FIG. 5, the air-increasing unit 14 of the control device 10 increases the engine speed NE by changing the gear position of the automatic transmission 274 to a gear position with a large gear ratio. When an increase in the engine speed NE increases the intake air amount GA, the catalyst drawn air amount increases. In this manner, the catalyst drawn air amount can be increased by increasing the gear ratio when an anomaly occurs in the variable valve mechanism 41.

Further, even in a case in which a hybrid vehicle includes a variable-speed mechanism capable of varying a gear ratio, the control device 10 may be applied to the hybrid vehicle. That is, in the same manner as the configuration of the above-described modification, the catalyst drawn air amount can be increased by increasing the gear ratio when an anomaly occurs in the variable valve mechanism 41.

The vehicle 200 illustrated in FIG. 8 does not include a motor generator. As long as the catalyst drawn air amount can be increased without executing motoring when an anomaly occurs in the variable valve mechanism 41, the control device 10 may be applied not only to a hybrid vehicle but also to a vehicle that does not include a motor generator. The control device 10 is not limited to one that performs software processing on all processes executed by itself. For example, the control device 10 may include a dedicated hardware circuit (for example, application specific integrated circuit: ASIC) that executes hardware processing on at least part of the processes executed by itself. That is, the control device 10 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control device for a vehicle, the vehicle being equipped with an internal combustion engine, the internal combustion engine including a catalyst arranged in an exhaust passage, a fuel injection valve that injects fuel into a cylinder, an air amount control valve that changes an intake air amount drawn into the cylinder, and a blow-by gas passage through which blow-by gas leaked from the cylinder into a crankcase is drawn into an intake passage, the control device comprising:
    an engine control unit configured to execute a fuel cutoff process, the fuel cutoff process stopping fuel injection from the fuel injection valve when stopping combustion in the cylinder in a case in which a crankshaft of the internal combustion engine is rotating; and
    an air-increasing unit configured to execute a temperature-increase limiting process when execution of the fuel cutoff process is requested, the temperature-increase limiting process drawing fresh air into the catalyst by increasing the intake air amount through control of the air amount control valve, wherein
    the air-increasing unit is configured to increase an amount of air drawn into the catalyst by increasing an engine speed in a case in which an anomaly occurs in driving of the air amount control valve when executing the temperature-increase limiting process, the engine speed being a rotation speed of the crankshaft.

2. The control device according to claim 1, wherein
    the vehicle is a hybrid vehicle, the hybrid vehicle including a motor generator capable of inputting an output torque to the crankshaft, and
    the air-increasing unit is configured to increase, when increasing the engine speed in the temperature-increase limiting process, the engine speed by rotating the crankshaft through driving by the motor generator.

3. The control device according to claim 1, wherein the vehicle is a vehicle in which mixed fuel of alcohol and gasoline is used.

4. The control device according to claim 1, wherein the air-increasing unit is configured to calculate an altitude of a road surface on which the vehicle is traveling, and increase, when increasing the engine speed in the temperature-increase limiting process, the engine speed as the altitude increases.

5. The control device according to claim 1, wherein
    the air amount control valve is an intake valve that connects and disconnects the intake passage to and from the cylinder,
    the internal combustion engine includes a throttle valve arranged in the intake passage and a variable valve mechanism capable of varying a timing of opening and closing the intake valve, and
    the air-increasing unit is configured to:
        when the execution of the fuel cutoff process is requested, in a case in which no anomaly occurs in the variable valve mechanism, fully open an open degree of the throttle valve and advance the timing of opening and closing the intake valve; and
        when the execution of the fuel cutoff process is requested, in a case in which an anomaly occurs in the variable valve mechanism, fully open the open degree of the throttle valve and increase the engine speed.

6. A control method for a vehicle, the vehicle being equipped with an internal combustion engine, the internal combustion engine including a catalyst arranged in an exhaust passage, a fuel injection valve that injects fuel into a cylinder, an air amount control valve that changes an intake air amount drawn into the cylinder, and a blow-by gas passage through which blow-by gas leaked from the cylinder into a crankcase is drawn into an intake passage, the control method comprising:
    executing a fuel cutoff process, the fuel cutoff process stopping fuel injection from the fuel injection valve when stopping combustion in the cylinder in a case in which a crankshaft of the internal combustion engine is rotating; and
    executing a temperature-increase limiting process when execution of the fuel cutoff process is requested, the temperature-increase limiting process drawing fresh air into the catalyst by increasing the intake air amount through control of the air amount control valve; and
    increasing an amount of air drawn into the catalyst by increasing an engine speed in a case in which an anomaly occurs in driving of the air amount control valve when executing the temperature-increase limiting process, the engine speed being a rotation speed of the crankshaft.

7. A non-transitory computer readable storage medium storing a program that causes a processor to execute a control process for a vehicle, the vehicle being equipped with an internal combustion engine, the internal combustion engine including a catalyst arranged in an exhaust passage, a fuel injection valve that injects fuel into a cylinder, an air amount control valve that changes an intake air amount drawn into the cylinder, and a blow-by gas passage through which blow-by gas leaked from the cylinder into a crankcase is drawn into an intake passage, the control process comprising:

executing a fuel cutoff process, the fuel cutoff process stopping fuel injection from the fuel injection valve when stopping combustion in the cylinder in a case in which a crankshaft of the internal combustion engine is rotating; and     executing a temperature-increase limiting process when execution of the fuel cutoff process is requested, the temperature-increase limiting process drawing fresh air into the catalyst by increasing the intake air amount through control of the air amount control valve; and     increasing an amount of air drawn into the catalyst by increasing an engine speed in a case in which an anomaly occurs in driving of the air amount control valve when executing the temperature-increase limiting process, the engine speed being a rotation speed of the crankshaft.

\* \* \* \* \*